Figure 1:
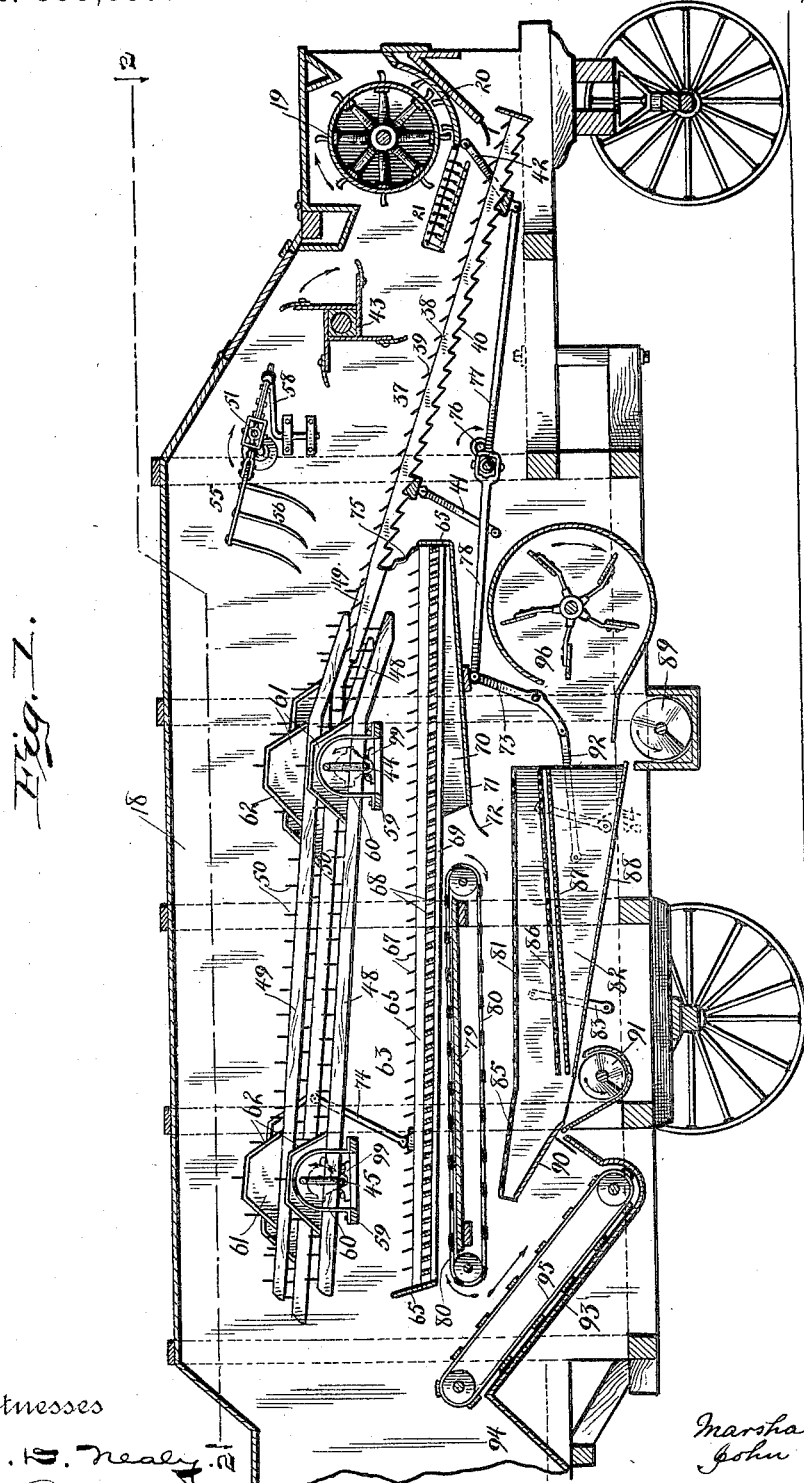

(No Model.) 8 Sheets—Sheet 1.

M. T. REEVES & J. N. KAILOR.
SEPARATOR.

No. 599,357. Patented Feb. 22, 1898.

Witnesses
Inventors
Marshal T. Reeves
John N. Kailor
By Attorneys (No Model.) 8 Sheets—Sheet 2.
M. T. REEVES & J. N. KAILOR.
SEPARATOR.
No. 599,357. Patented Feb. 22, 1898.
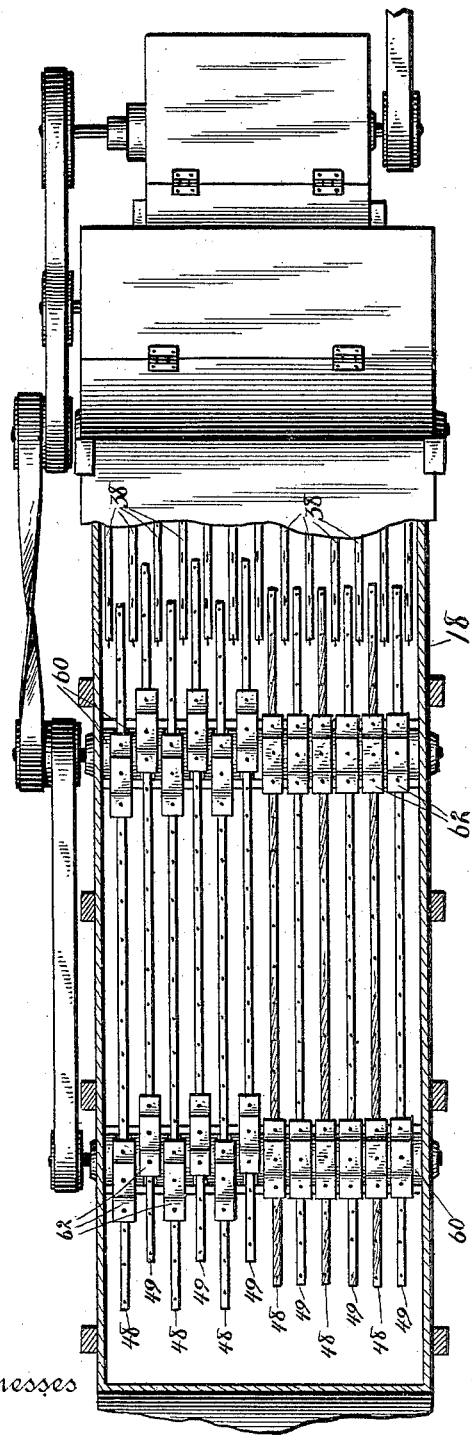
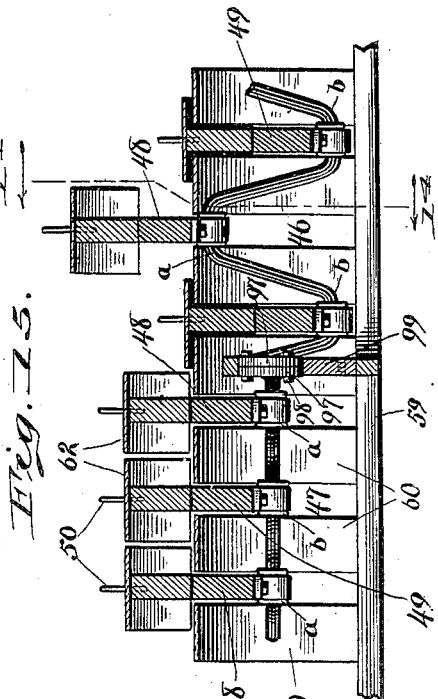
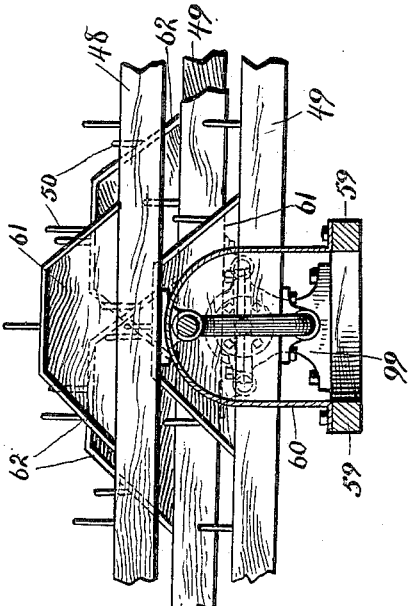
Witnesses
Inventors
Marshal T. Reeves
John N. Kailor
By Attorneys (No Model.) 8 Sheets—Sheet 3.
M. T. REEVES & J. N. KAILOR.
SEPARATOR.
No. 599,357. Patented Feb. 22, 1898.
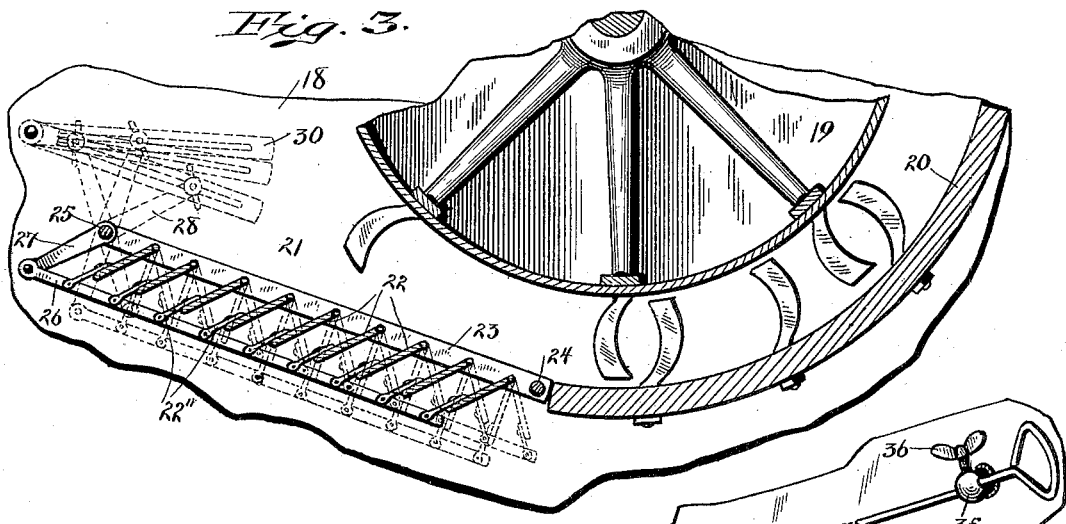
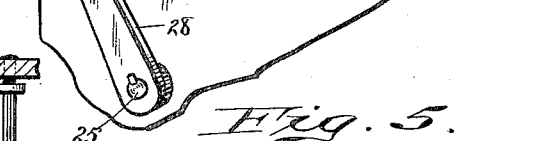
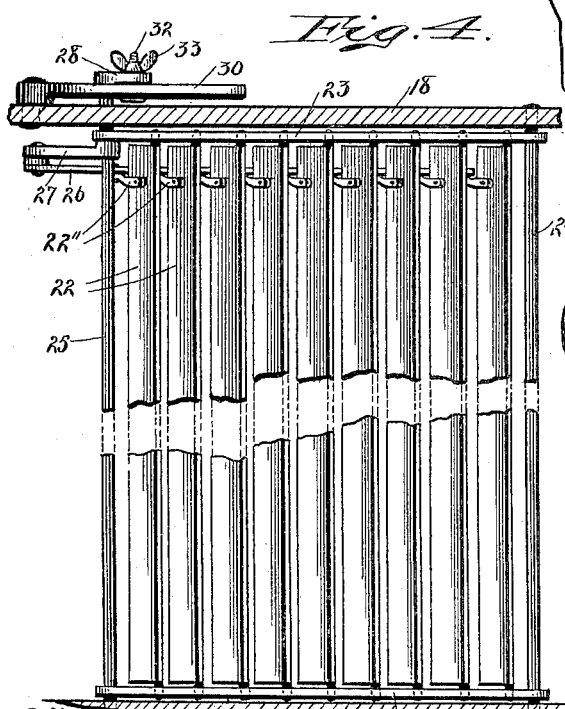
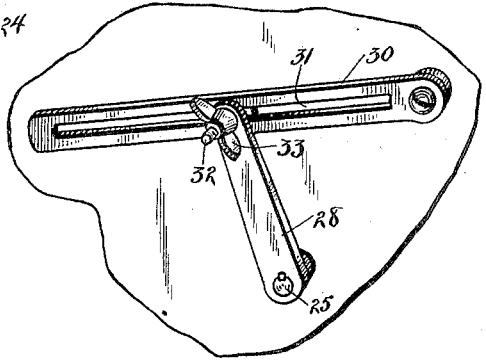
Witnesses
H. S. Nealy
M. Austemiller
Inventors
Marshal T. Reeves
John N. Kailor
By Attorneys
H. P. Hoodson (No Model.) 8 Sheets—Sheet 4.
M. T. REEVES & J. N. KAILOR.
SEPARATOR.
No. 599,357. Patented Feb. 22, 1898.
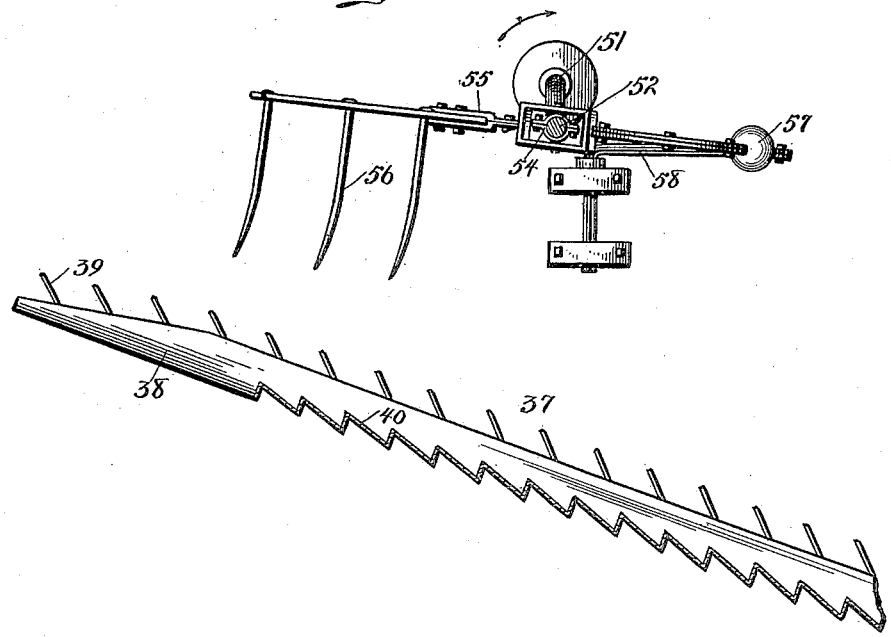
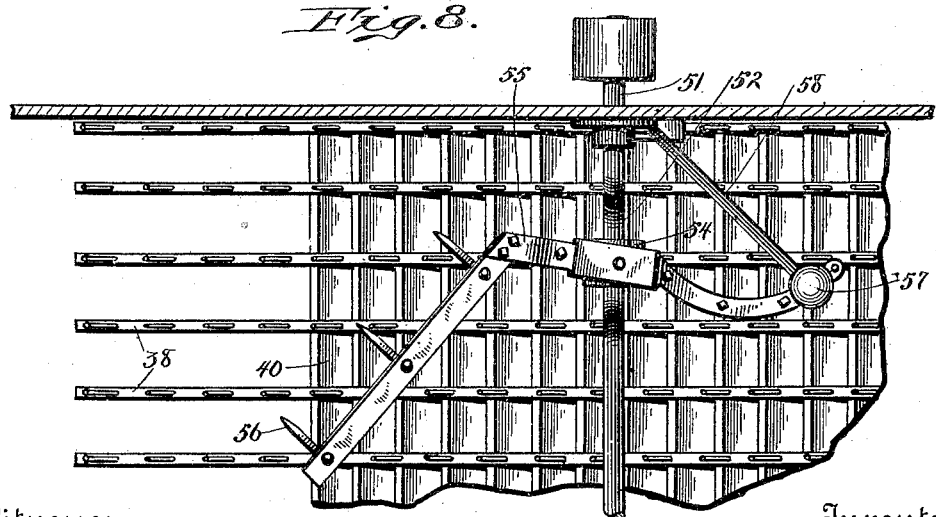
Witnesses
H. D. Nealy
M. Austemiller
Inventors
Marshal T. Reeves
John N. Kailor
By Attorneys
H. P. Hoodrdy
THE NORRIS PETERS CO., PHOTO-LITHO., WASHINGTON, D. C.

(No Model.) 8 Sheets—Sheet 5.
M. T. REEVES & J. N. KAILOR.
SEPARATOR.
No. 599,357. Patented Feb. 22, 1898.
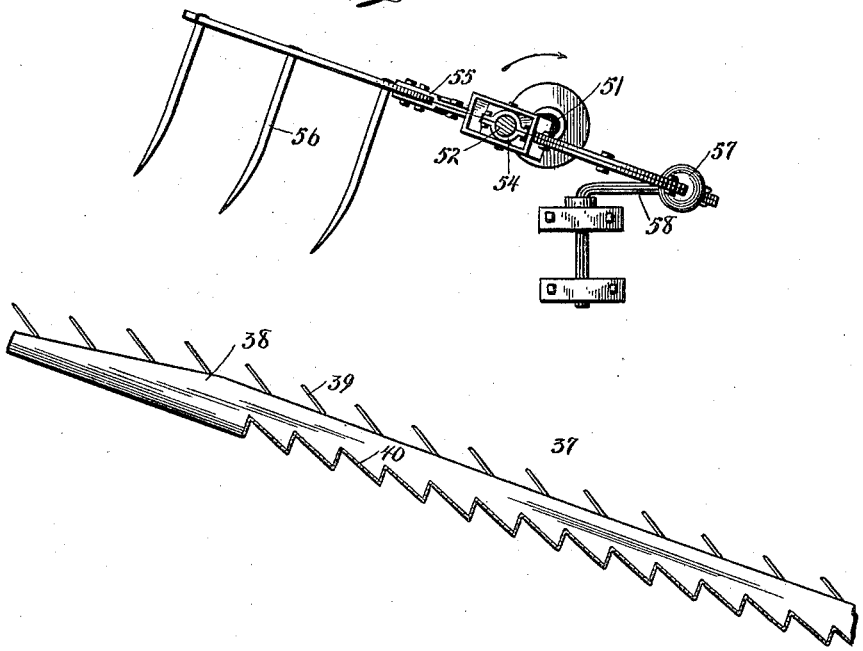
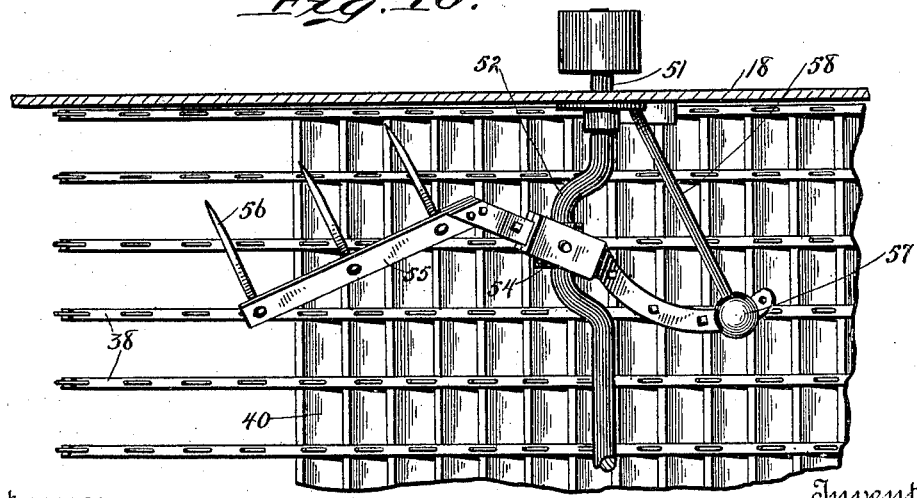

(No Model.) 8 Sheets—Sheet 6.
M. T. REEVES & J. N. KAILOR.
SEPARATOR.
No. 599,357. Patented Feb. 22, 1898.
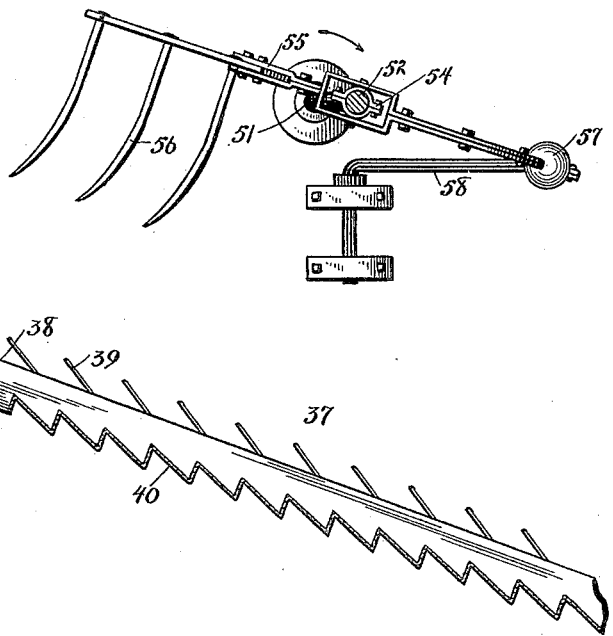
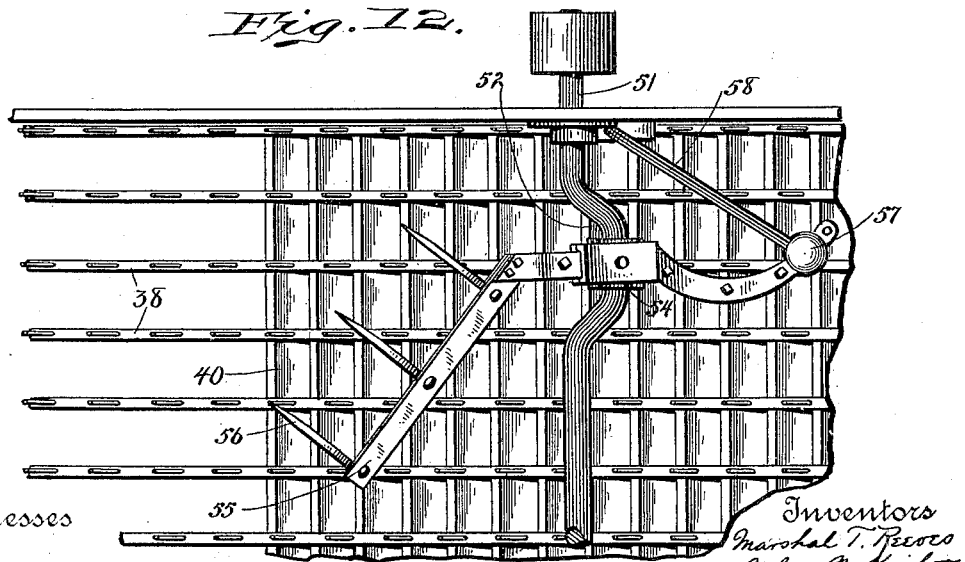

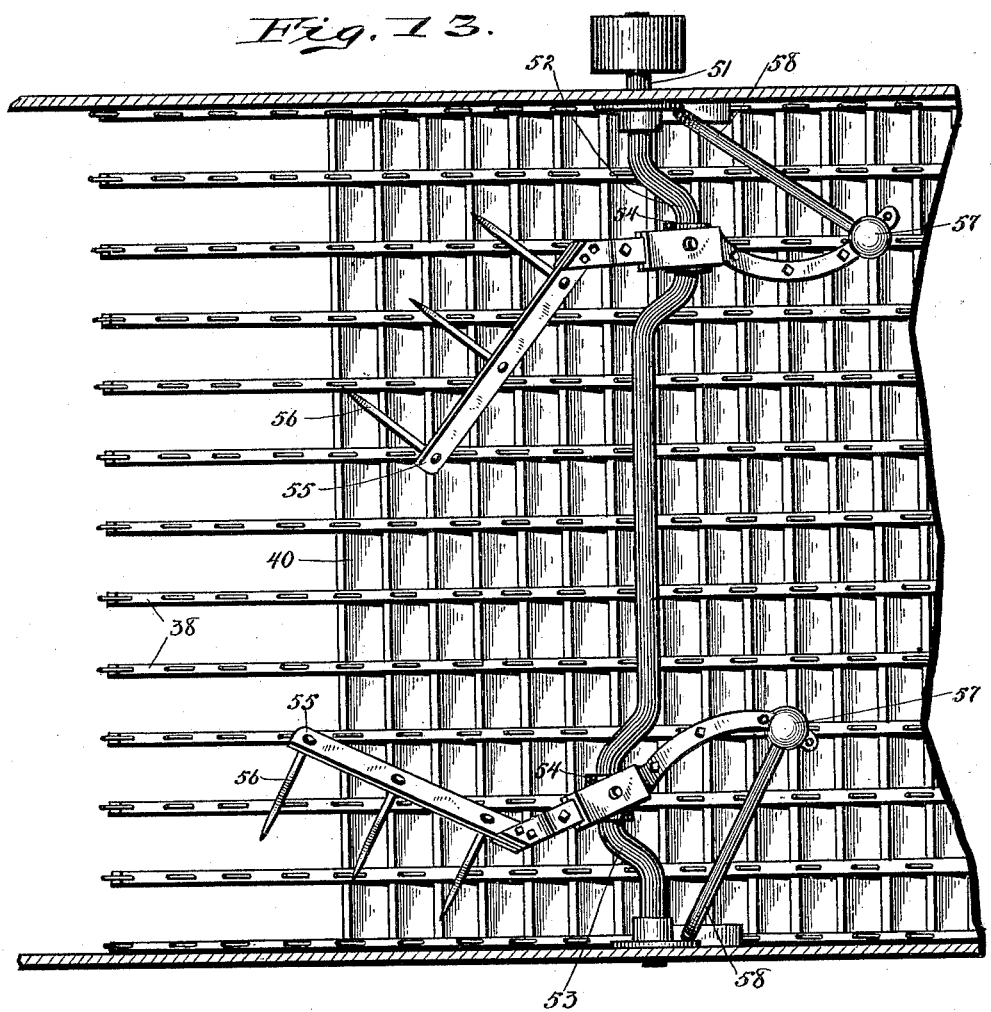

(No Model.) 8 Sheets—Sheet 8.
M. T. REEVES & J. N. KAILOR.
SEPARATOR.
No. 599,357. Patented Feb. 22, 1898.
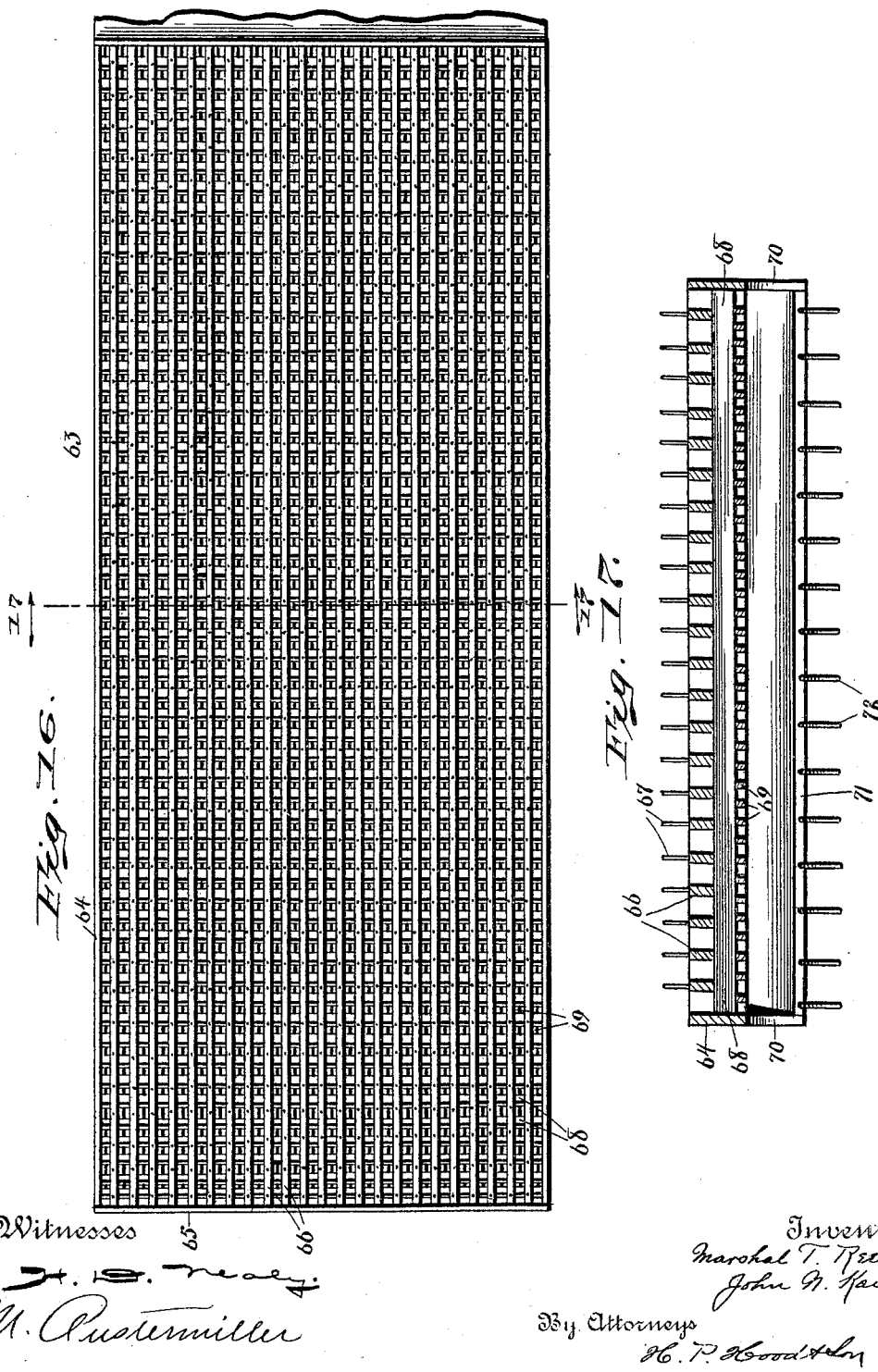

UNITED STATES PATENT OFFICE.

MARSHAL T. REEVES AND JOHN N. KAILOR, OF COLUMBUS, INDIANA, ASSIGNORS TO REEVES & CO., OF SAME PLACE.

SEPARATOR.

SPECIFICATION forming part of Letters Patent No. 599,357, dated February 22, 1898.

Application filed April 1, 1896. Serial No. 585,694. (No model.)

*To all whom it may concern:*

Be it known that we, MARSHAL T. REEVES and JOHN N. KAILOR, citizens of the United States, residing at Columbus, in the county of Bartholomew and State of Indiana, have invented a new and useful Separator, of which the following is a specification.

Our invention relates to an improvement in machines for threshing or separating wheat and other like grains.

The objects of our invention are, first, to pass the grain-heads through such a series of operations that the grain will be thoroughly separated therefrom; second, to so construct the grating which lies immediately to the rear of the concave that it may be adjusted to suit various kinds and conditions of grain; third, to provide means for shaking or beating the grain-heads from the under side; fourth, to prevent the straw from becoming entangled in said means; fifth, to provide improved means for spreading the straw after it has left the cylinder and concave, and, sixth, to provide an improved separating-table.

The accompanying drawings illustrate our invention.

Figure 1 is a central longitudinal section of our machine, the feeder and stacker-fan having been omitted. Fig. 2 is a plan on line 2 2 of Fig. 1. Fig. 3 is a side elevation of the adjustable grating which is located immediately to the rear of the concave. Fig. 4 is a plan of the same. Fig. 5 is a detail of means for adjusting the grating. Fig. 6 is a detail of another means for adjusting the grating. Fig. 7 is a side elevation of one of our improved spreaders in its lowest position. Fig. 8 is a plan of the parts as shown in Fig. 7. Fig. 9 is a side elevation of the spreader shown in Fig. 7 with the parts moved through an angle of ninety degrees. Fig. 10 is a plan of the parts as shown in Fig. 9. Fig. 11 is a side elevation of the spreader shown in Fig. 7 with the parts moved through an angle of two hundred and seventy degrees. Fig. 12 is a plan of the parts as shown in Fig. 11. Fig. 13 is a plan of the two spreaders. Fig. 14 is a detail in side elevation of the means for preventing the straw from wrapping about the upper crank-shafts. Fig. 15 is a cross-section of the same. Fig. 16 is a plan of the improved separating-table, and Fig. 17 is a cross-section on line 17 17 of Fig. 16.

In the drawings, 18 indicates the separator-casing, 19 the threshing-cylinder, and 20 the concave, all of any well-known construction.

The action of the cylinder and concave upon the grain-heads separates a considerable quantity of grain therefrom, and it is desirable that the grain so separated be allowed to immediately drop upon the first separating-table. For this purpose it has heretofore been customary to place immediately to the rear of the concave a grating of one or the other of two general types. One type consists of wires or bars extending longitudinally toward the rear of the separator, and the other type consists of a short series of transverse bars or slats, these slats being differently inclined according to the caprice of the manufacturer, but always being rigidly secured. In actual practice different kinds and conditions of grain must be treated in widely-different ways, and while such a grating with the slats set at a particular angle might work well at one time it might be practically inoperative at another time when the grain was in a different condition. Take wheat, for example. If the wheat is dry and the stalks are long, it has been found advisable to so set the slats that the channels between them will point toward the cylinder, as shown in full lines in Fig. 3, so that the separated grain will be thrown between the slats and down upon the forward end of the first separating-table, the grain heads and stalks passing over the grating and then falling upon said table at a point in the rear of where the separated grain has fallen. If, however, the stalks are wet or are very short, it has been found that with the slats placed in the position suitable for dry stalks the wet or short stalks will be forced into the openings between the slats and the machine will soon become choked and inoperative. When such a choking occurs, the grain and straw are carried completely around by the cylinder, and such action is termed "spitting" by threshermen. In practice it has been found that the best separation is obtained when the slats of the grating are so placed that the cylinder will be almost on the point of spitting, and for the purpose of accommodating our machine to all classes and conditions of grain we have constructed the grating in the following manner:

Concave 20 is extended slightly beyond the medial line of the cylinder, and located immediately to the rear of the concave is a grating 21. Grating 21 is composed of a series of slats 22, pivoted at their upper edges between a pair of side bars 23, each of which is supported at one end on the transverse bars 24 and at the other end on the transverse shaft 25. Secured to each slat 22 is a downwardly-extending finger 22", and the lower end of each of said fingers is pivoted to a pitman 26, the forward end of which is pivotally connected to an arm 27, secured to shaft 25, the arrangement being such that by rocking shaft 25 backward or forward slats 22 may be set at any desired angle, as indicated by dotted lines in Fig. 3. For the purpose of securing slats 22 in position shaft 25 is extended at one end through the separator-casing 18, and to this extended end is secured an arm 28, the free end of which may be adjustably secured. Pivoted to casing 18 near shaft 25 is an arm 30, provided with a longitudinal slot 31, and through said slot and through the outer end of arm 28 is passed a bolt 32, provided on its outer end with a thumb-nut 33. If desired, arm 30, bolt 32, and nut 33 may be dispensed with and a rod 34 secured at one end to the free end of arm 28 and at the other end passed through an eye 35, placed near the forward end of the machine within easy reach of the operator and provided with a thumb-screw 36 for securing said rod in any desired position.

Below grating 21 and extending in an upward direction toward the rear of the machine is the first separating-table 37. Table 37 is composed of a series of longitudinal bars 38, each provided on its upper edge with a series of forwardly and upwardly projecting teeth 39 and the usual corrugated bottom 40, secured to the under edges of bars 38 and extending from the front of said bars to within a short distance of the rear thereof, and said table is suspended upon two pairs of links 41 and 42 in the usual well-known manner.

Above table 37 and to the rear of grating 21 is a beater 43, extending across the machine and so arranged as to intercept all of the straw and grain which is thrown from the cylinder over grating 21 and deposit it upon table 37.

To the rear of table 37 and extending transversely across the machine-casing 18 are two crank-shafts 44 and 45, the particular construction of which will be hereinafter explained. Connecting the cranks of each crank-shaft and pivotally mounted thereon are two sets of longitudinal rake-bars 48 and 49, each provided on their upper edges with a series of upwardly-extending teeth or wires 50. The arrangement of shafts 44 and 45 and rake-bars 48 and 49 is such that as the said shafts are rotated in the direction indicated by the arrows thereon the forward ends of the rake-bars will pass upward between the rear ends of bars 38 of table 37 and will lift the straw therefrom.

The threshing-cylinder is generally made considerably narrower than the rear portion of the machine, and the straw as it passes over the grating and is deposited upon table 37 lies in a heap in the middle of said table. For the purpose of distributing the straw over the entire rear surface of table 37 and for the purpose of placing it in position to be evenly distributed over rake-bars 48 and 49 a shaft 51, extending across the machine and provided with a pair of oppositely-arranged cranks 52 and 53, is mounted in suitable bearings above the rear end of table 37. Each crank 52 and 53 is provided with a boxing 54, which is free to rotate thereon, and pivoted upon said boxing, so as to swing in a plane substantially parallel with shaft 51, is a spreader 55, provided at its rear end with a series of downwardly-projecting teeth 56 and at its forward end with a socket 57. Socket 57 receives a ball carried by an arm 58, which is pivoted on the inside of the casing 18, so as to swing in a substantially horizontal plane. Arm 58 is preferably placed a short distance below shaft 51 and in front thereof, so that, beginning with the position shown in Figs. 11 and 12 and rotating shaft 51 in the direction indicated by the arrow thereon, teeth 56 are first forced rearward and downward into the straw on table 37. A further movement of shaft 51 causes the rear end of the spreader, together with teeth 56, to be raised, and at the same time, owing to the inward movement of the forward end of spreader 55 caused by the movement of arm 58, the said teeth are forced outward away from the center of the machine and toward the casing thereof, thereby picking a portion of the straw from the heap in the middle of table 37 and scattering it outward over the table toward the casing. Cranks 52 and 53 being arranged opposite one another, the two spreaders alternately engage portions of the straw and scatter and spread it toward opposite sides of the machine.

It has been customary heretofore to spread the straw by means of [a pair of diagonally-arranged rotating drums provided with teeth adapted to engage the straw. These drums are operated by means of gearing and require a large amount of power to drive them, and by their use the straw while it is being spread over the table is at the same time packed down, so that it is difficult for the grain to become separated therefrom and fall upon the second separating-table. By our construction the straw is operated upon by a pitchfork action and is loosened up at the same time that it is being spread upon the table. It has been found that this construction aids very materially in the separation of the grain from the straw.

The straw as it reaches the rear end of table 37 is alternately engaged by each set of rake-bars 48 and 49 and lies on the top thereof and is wholly supported thereby. As the said straw passes each one of the crank-shafts 44 and 45 there would be a tendency for portions of it to wrap about the cranks thereof, and for the purpose of preventing this a pair of transverse bars 59 are secured to the casing below each shaft, one on each side thereof, and secured to each pair of said bars are a series of shields 60, which substantially fill the space between each of the rake-bars 48 and 49, and thereby form a covering for a portion of the path of movement of the cranks 46 and 47. Upon each of bars 48 and 49, opposite their point of attachment to cranks 46 and 47, is secured a block 61, to the upper edge of which is secured a shield 62, sufficient in width to overlap the adjacent edges of shields 60, blocks 61 being of sufficient size and of the proper shape to lie closely to shields 60 when the rake-bar is in its lowest position.

Located below rake-bars 48 and 49 and the rear end of table 37 is a second separating-table 63. Said table is composed of the sides 64, ends 65, a series of longitudinal bars 66, each provided with a series of upwardly-projecting teeth 67 on its upper edge, a series of transverse rearwardly and upwardly inclined bars 68, mounted immediately below bars 66, and a series of longitudinal bars 69, secured to the lower edges of bars 68. The spaces between bars 66 are larger than those between bars 68, and those between bars 68 are larger than those between bars 69. The forward ends of sides 64 are provided with downward projections 70, and between the lower edges of these projections is secured a bottom 71, inclined rearwardly and downwardly and provided at its rear end with a series of projecting teeth 72. Table 63 is supported by two pair of links 73 and 74, the forward end of said table being connected to the rear end of bottom 40 of table 37 by means of a piece of flexible material 75. Tables 37 and 63 are operated by means of the crank-shaft 76 and the pitmen 77 and 78 in the usual manner.

Located below table 63, beginning at a point near the rear end thereof and extending to a point near the rear end of bottom 71, is a transverse platform 79, extending entirely across the machine. At each end of platform 79 is mounted a shaft carrying suitable pulleys, on which is mounted an endless slatted carrier 80, the arrangement being such that the slats of said carrier will scrape the top of said platform and cause any material which is deposited thereon to be forced over the forward edge of said platform and drop upon screen 81 of screen-shoe 82. Screen-shoe 82 is mounted upon two pairs of links 83 and 84 and is provided with the usual screens 81, 85, 86, and 87. Immediately below the forward edge of the bottom of the screen-shoe 82 is located the usual grain-conveyer 89, and below the forward edges of screens 86 and 87 and the rear edge of bottom 90 is the usual tailings-conveyer 91. The lower ends of links 73 are extended below the pivot-point, and each of said lower ends is connected to the screen-shoe by means of a link 92.

The rear end of casing 18 is provided with an upwardly and rearwardly inclined bottom 93, which leads from a point below the rear end of screen-shoe 82 to the forward end of a chute 94, which leads into the straw-elevator casing. (Not shown.) Immediately above bottom 93 is mounted an endless slatted carrier 95, the arrangement being such that the chaff which is thrown over the rear end of screen-shoe 82 will be deposited on bottom 93 and from there be carried upward by the slats of carrier 95 and forced into chute 94. A fan 96 is mounted in front of the screen-shoe in the usual manner.

Crank-shafts 44 and 45 may be made in any suitable manner, but in separators of ordinary width a crank-shaft of considerable length is required. It has been found very difficult, practically impossible, to cast a crank-shaft of such length in a single piece and to have said shaft sufficiently straight to properly operate. In a shaft of such length it is also advisable to provide an intermediate bearing therefor, and in shafts of the ordinary construction this is practically impossible without interfering with the regular spacing of the cranks. To obviate these difficulties, each crank-shaft is formed of two, preferably cast, sections 46 and 47, each of said sections being provided with two series of oppositely-arranged cranks $a$ and $b$, and upon one end of each section is formed one-half of a coupling 97. The face and periphery of each half of the coupling is carefully turned true, and then the two faces thereof are bolted together by a series of bolts 98. A boxing 99 is secured to the transverse bars 59 and is adapted to receive said coupling and thereby support the middle of said shaft. Each half of the coupling is preferably formed integral with one of the cranks and is of course opposite the center of the shaft, so that when the two halves of the coupling are properly trued and bolted together the said shaft runs perfectly true at the ends and at the middle, and the distance between the cranks which are adjacent to the middle of the shaft is the same as the distance between any of the other cranks. By the above-described construction the same pattern may be used for both halves of the crank-shaft, and if it is found desirable the cranks of one section may be set at an angle to the cranks of the other section, as shown in Figs. 14 and 15.

The operation of our device is as follows: The various parts being set in motion in the direction indicated by the arrows thereon, the grain stalks or bundles are fed between the cylinder and the concave. The operator then loosens nut 36, and by moving rod 34 forward or backward tilts slats 22 forward or backward until the cylinder begins to carry the grain entirely around. Rod 34 is then pushed backward a short distance and secured in position. As the grain-stalks pass between the cylinder and concave the grain is separated from the heads and, being heavier than the straw, a large portion is thrown between the slats 20 and drops through upon the bottom 40 of table 37, while the straw passes over the grating and is intercepted by beater 43 and deposited upon table 37 and rests upon bars 38 thereof. The vibration of table 37 causes the straw, by means of teeth 39, to travel toward the rear of the table, and also causes the grain and chaff, which falls from the straw to the bottom 40 of said table, to jump from one corrugation to another. As the straw advances it comes under the spreaders 55, and by them it is spread evenly over the entire upper end of the table in the manner previously described. The complete stirring given the straw by means of these spreaders causes the grain and the chaff and fine stuff to drop between the projecting ends of bars 38, while the long straw is engaged and drawn forward and upward by the rake-bars 48 and 49. The said rake-bars engage the straw from the under side, and it rests entirely thereon, the alternate movement of the rake-bars causing the straw to move toward the rear of the machine, at the same time beating the straw from the under side and thereby causing all of the grain to be shaken from the straw. It will be noticed that in this construction there is no fixed portion in this part of the machine to prevent the grain and short stuff from dropping immediately between the rake-bars. The grain, short stuff, and chaff, which fall between the rear ends of bars 38 and between rake-bars 48 and 49, fall upon separating-table 63, the completely-separated grain and the smaller portions of chaff, &c., passing directly through between bars 66, 68, and 69 either upon bottom 71 or upon platform 79. The longer pieces of straw and the blades or leaves rest upon the upper edges of bars 66 and are gradually forced backward by means of teeth 67 toward the rear of the table, and from there the material is carried into chute 94. As the material advances along bars 66 the grain is shaken out of it, and the said separated grain, together with the finer stuff, passes between said bars and falls upon the upper edges of bars 68. The vibration of the table causes this material to pass over bars 68 until the grain, chaff, and considerable fine stuff will pass between said bars. The material then falls upon the upper edges of longitudinal bars 69, and again the grain, chaff, and fine stuff are further separated from the coarser material and permitted to pass between said bars and fall either upon bottom 71 or upon platform 79. The larger pieces of straw, &c., pass over the rear end of table 63 and into chute 94. The material which has been deposited upon bottom 71 of table 63 is caused by the vibration of the table to slide down said bottom, and the fully-separated grain falls directly upon the forward end of screen 81, and from there passes directly through said screen and through screens 86 and 87 onto bottom 88 of the screen-shoe, and from there passes into the grain-conveyer. The chaff, &c., pass from bottom 71 over teeth 72 and are deposited on screen 81, near the rear thereof. The material which has been deposited on platform 79 is also deposited on screen 81 at substantially the same point by means of carrier 80, and from this point the material is passed over and through screens 81 and 85, that which passes through screens 81, 86, and 87 dropping upon bottom 88 and from there passing into the grain-conveyer, that which passes through screens 81 and 85, but fails to pass through the other screens, being deposited in the tailings-conveyer and from there returned to the cylinder, and that which passes over the rear end of screen 85 dropping upon bottom 93. All of the material which is deposited on bottom 93 is carried upward thereon by means of the slats of carrier 95 and is forced into chute 94, from which it passes to a straw-elevator of any desired pattern.

It will be noticed that by placing the bars of one series composing table 63 at an angle to the other two series of bars the material is very finely separated before it passes through the table, much more so than if all of the bars were arranged in the same direction or if only two sets of bars were used. After passing through the above-described table the material is so perfectly divided that but little remains for the screens of the screen-shoe to do, so that the grain passes rapidly therethrough, thus materially increasing the capacity of the machine.

We claim as our invention—

1. In a separator, the combination with the cylinder and concave, of a pair of side bars located immediately to the rear of the concave, a series of transverse slats pivoted between said bars, a pitman connected to each of said slats, a shaft mounted in the casing and provided with a pair of arms, one of said arms being connected with said pitman and the other of said arms being connected to a rod adjustably mounted on the casing and extending within reach of the operator, and means for securing said rod at any desired point of adjustment, all combined and arranged substantially as set forth, whereby, the said slats may be set at any desired point of adjustment by the movement of said rod.

2. In a separator, the combination with the cylinder and concave, of a grating located immediately to the rear of the concave and consisting of a series of transverse, angularly-adjustable slats, the arrangement being such that the openings between said slats may be directed toward or from the cylinder, substantially as described.

3. In a separator, the combination with a transverse crank-shaft, of a boxing mounted on the crank thereof, a spreader-arm pivoted on said boxing, and means connected with said spreader-arm whereby the said arm will be caused to swing upon its pivot by the movement of the crank-shaft.

4. In a separator, the combination with a transverse crank-shaft provided with a pair of cranks, a boxing mounted on each of said cranks, a spreader-arm pivoted on each of said boxings, and means connected with each of said spreader-arms whereby the said arms will be caused to swing upon their pivots by a movement of the crank-shaft.

5. In a separator, the combination with a transverse crank-shaft, of a boxing mounted on the crank thereof, an arm pivoted so as to swing in a substantially horizontal plane, a spreader-arm pivoted on said boxing and provided at one end with means for engaging the straw, and intermediate connecting mechanism connecting the opposite end of the spreader-arm and the swinging arm, whereby the spreader-arm is caused to swing upon its pivot by a movement of the crank-shaft.

6. In a separator, the combination with a transverse crank-shaft provided with a pair of cranks, a boxing mounted on each of said cranks, a pair of pivoted arms, one of said arms being mounted near each crank of the crank-shaft, a spreader-arm pivoted to each of said boxings and each provided at one end with means for engaging the straw, and intermediate connecting means connecting the opposite end of each spreader-arm with one of the swinging arms, whereby each spreader-arm is caused to swing upon its pivot by a movement of the crank-shaft.

7. In a separator, the combination with a crank-shaft, a boxing mounted on the crank thereof, a spreader-arm pivoted on said boxing and provided at one end with means for engaging the straw, a swinging arm, and a ball-and-socket joint connecting the free end of said swinging arm with the spreader-arm, all combined and arranged in such a manner that the spreader-arm will be caused to swing upon its pivot by a movement of the crank-shaft.

8. In a separator, the combination with a crank-shaft provided with a pair of cranks, a boxing mounted on each of said cranks, a spreader-arm pivoted on each of said boxings and provided at one end with means for engaging the straw, a pair of swinging arms mounted one near each crank, and ball-and-socket joints connecting the swinging arms with the spreader-arms, all combined and arranged in such a manner that the spreader-arms will be caused to swing upon their pivots by a movement of the crank-shaft.

9. A covering for a rake-bar crank-shaft consisting of a series of stationary shields mounted between said rake-bars and arranged to cover a portion of the path of travel of the cranks thereof.

10. A covering for a rake-bar crank-shaft, consisting of a series of shields mounted between said rake-bars and arranged to cover a portion of the path of travel of the cranks thereof, and a series of shields carried by the rake-bars and adapted to overlap the adjacent edges of the first-mentioned shields.

11. In a separator, the combination with the rake-bar crank-shaft and the rake-bars carried thereby, of a series of shields mounted between the rake-bars and arranged to cover a portion of the path of travel of the cranks thereof, and a second series of shields carried by the rake-bars and adapted to overlap the adjacent edges of the first-mentioned shields.

12. In a separator, the combination with the rake-bar crank-shaft and the rake-bars carried thereby, of the bars 59 arranged below the crank-shaft, one at each side thereof, shields 60 secured to said bars and extending over said crank-shaft, and shields 62 carried by the rake-bars and adapted to overlap the adjacent edges of shields 60, substantially as shown and described.

13. In a separator, a separating-table consisting of a series of longitudinal bars provided on their upper edges with a series of rake-teeth, a series of transverse bars mounted beneath the said longitudinal bars and placed nearer together than said longitudinal bars, a second series of longitudinal bars mounted beneath the transverse bars and placed nearer together than said transverse bars, as and for the purpose set forth.

14. In a separator, a separating-table consisting of three series of bars, one of said series being placed between and across the other series, the openings between the bars of the upper series being greater than the openings between the bars of the middle series and the openings between the bars of the middle series being greater than the openings between the bars of the lowest series.

15. In a separator, a separating-table consisting of a series of longitudinal bars provided on their upper edges with a series of rake-teeth, a series of inclined transverse bars mounted beneath said longitudinal bars and placed nearer together than the said longitudinal bars, a second series of longitudinal bars mounted beneath the transverse bars and placed nearer together than the said transverse bars, substantially as described.

16. In a separator, the combination with the cylinder and concave, of a series of transverse, angularly-adjustable slats mounted to the rear of said cylinder and concave, a separating-table mounted below said slats and adapted to receive the material which passes between the cylinder and concave, a crank-shaft mounted above said table, a boxing mounted on the crank of said crank-shaft, a spreader-arm pivoted to said boxing, and means for causing said arm to swing laterally upon its pivot by a movement of the crank-shaft.

17. In a separator, the combination with the cylinder and concave, of a vibrating separating-table mounted in position to receive all of the material therefrom, a series of rake-bars adapted to remove the straw from said table and to convey it away from the said table, and a second vibrating separating-table mounted below said rake-bars in position to receive the material from the first table and the material which drops away from said rake-bars, all combined and arranged to coöperate as and for the purpose set forth.

18. In a separator, the combination with the cylinder and concave, of a vibrating separating-table mounted in position to receive all of the material therefrom, two series of rake-bars adapted to remove the straw from said table, said rake-bars being adapted to entirely support the straw and to alternately beat it from the under side, and a second vibrating separating-table mounted below and in position to receive material passing between said rake-bars and the material from the first table, all combined and arranged to coöperate as and for the purpose set forth.

19. In a separator, the combination with the cylinder and concave, of a vibrating separating-table mounted in position to receive all of the material therefrom, two series of rake-bars adapted to remove the straw from said table, said rake-bars being adapted to entirely support the said straw and to alternately beat it from the under side, a second vibrating separating-table mounted below said rake-bars and in position to receive material passing between said rake-bars and the material from the first table, the said second table being provided with a downwardly-inclined bottom extending for a portion of the length of said table, a platform mounted below the bottomless portion of said table and adapted to receive any material which passes therethrough, and means for sweeping said material from said platform, substantially as described.

20. In a separator, the combination with the cylinder and concave, of a vibrating separating-table mounted below said cylinder, a series of rake-bars mounted upon a pair of crank-shafts and adapted to remove the straw from said table, said rake-bars being adapted to entirely support said straw and to alternately beat it from the under side, a series of shields mounted between the rake-bars and adapted to cover the crank-shafts, and a series of shields carried by the rake-bars and adapted to overlap the adjacent edges of the first-mentioned shields.

21. In a separator, the combination with the cylinder and concave, of a vibrating separating-table mounted below said cylinder, two series of rake-bars adapted to remove the straw from said table, said rake-bars being adapted to entirely support the straw and to alternately beat it from the under side, a second vibrating separating-table mounted beneath said rake-bars, the said table consisting of a series of longitudinal bars, a series of transverse bars mounted beneath said bars and placed nearer together than said longitudinal bars, and a second series of longitudinal bars mounted beneath the transverse bars and placed nearer together than said transverse bars.

22. In a separator, the combination with the cylinder and concave, of a vibrating separating-table mounted below said cylinder, two series of rake-bars adapted to remove the straw from said table, the said rake-bars being adapted to entirely support the straw and to alternately beat it from the under side, a second vibrating separating-table mounted beneath the said rake-bars, the said table consisting of a series of longitudinal bars, a series of transverse bars mounted beneath said bars and placed nearer together than said longitudinal bars, a second series of longitudinal bars mounted beneath the transverse bars and placed nearer together than said transverse bars, and a downwardly-inclined bottom extending for a portion of the length of said table and adapted to receive any material which passes therethrough.

23. In a separator, the combination with the cylinder and concave, of a vibrating separating-table mounted in position to receive all the material therefrom, means for spreading the straw laterally upon said table, two series of rake-bars adapted to remove the straw from said table, said rake-bars being adapted to entirely support the said straw and to alternately beat it from the under side, and a second vibrating separating-table mounted below said rake-bars in position to receive material passing therebetween and the material from the first table, all combined and arranged to coöperate as and for the purpose set forth.

24. In a separator, the combination with the cylinder and concave, of a vibrating separating-table mounted in position to receive all of the material therefrom, means for spreading the straw laterally upon said table, two series of rake-bars adapted to remove the straw from said table, said rake-bars being adapted to entirely support the straw and to alternately beat it from the under side, a second vibrating separating-table mounted below said rake-bars in position to receive material passing therebetween and the material from the first table, the said second table being provided with a downwardly-inclined bottom extending for a portion of the length of said table, a platform mounted below the bottomless portion of said table and adapted to receive any material which passes therethrough, and means for sweeping said material from said platform, substantially as described.

25. In a separator, the combination with the cylinder and concave, of a vibrating separating-table mounted below said cylinder, means for spreading the straw upon said table, two series of rake-bars mounted upon a pair of crank-shafts and adapted to remove the straw from said table, said rake-bars being adapted to entirely support the straw and to alternately beat it from the under side, a series of shields mounted between the rake-bars and adapted to cover the crank-shafts, and a series of shields carried by the rake-bars and adapted to overlap the adjacent edges of the first-mentioned shields.

26. In a separator, the combination with the cylinder and concave, of a vibrating separating-table mounted below said cylinder, means for spreading the straw laterally upon said table, two series of rake-bars adapted to remove the straw from said table, said rake-bars being adapted to entirely support said straw and to beat it from the under side, a second vibrating separating-table mounted beneath said rake-bars in position to receive material passing therebetween, the said table consisting of a series of longitudinal bars, a series of transverse bars mounted beneath said bars, and a second series of longitudinal bars mounted beneath said transverse bars.

27. In a separator, the combination with the cylinder and concave, of a vibrating separating-table mounted below said cylinder, means for spreading the straw laterally upon said table, two series of rake-bars adapted to remove the straw from said table, the said rake-bars being adapted to entirely support said straw and to beat it from the under side, a second vibrating separating-table mounted beneath said rake-bars in position to receive material passing therebetween, the said table consisting of a series of longitudinal bars, a series of transverse bars mounted beneath said bars, a second series of longitudinal bars mounted beneath said transverse bars, and a downwardly-inclined bottom extending for a portion of the length of said table, a platform mounted below the bottomless portion of the table and adapted to receive any material passing therethrough, and means for sweeping said material from said platform.

MARSHAL T. REEVES.
JOHN N. KAILOR.

Witnesses:
C. S. WAY,
FRED DOELLER.